United States Patent
Esenwein et al.

(10) Patent No.: US 10,854,054 B2
(45) Date of Patent: Dec. 1, 2020

(54) ANTI-THEFT MODULE FOR A RECHARGEABLE BATTERY-OPERATED ELECTRIC MACHINE TOOL, AND RECHARGEABLE BATTERY-OPERATED ELECTRIC MACHINE TOOL COMPRISING AN ANTI-THEFT MODULE

(71) Applicant: Robert Bosch GmbH, Stuttgart (DE)

(72) Inventors: Florian Esenwein, Leinfelden-Echterdingen (DE); Wolfgang Hirschburger, Reutlingen (DE); Christoph Buehlen, Weilheim (DE); Anna Verena Eireiner, Stadtbergen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/072,105

(22) PCT Filed: Jan. 30, 2017

(86) PCT No.: PCT/EP2017/051874
§ 371 (c)(1),
(2) Date: Jul. 23, 2018

(87) PCT Pub. No.: WO2017/133991
PCT Pub. Date: Aug. 10, 2017

(65) Prior Publication Data
US 2019/0027002 A1    Jan. 24, 2019

(30) Foreign Application Priority Data

Feb. 1, 2016    (DE) .................. 10 2016 201 497

(51) Int. Cl.
*G08B 13/14*    (2006.01)
*B25F 5/00*    (2006.01)
(Continued)

(52) U.S. Cl.
CPC ............ *G08B 13/1418* (2013.01); *B25F 5/00* (2013.01); *B25F 5/02* (2013.01); *G08B 13/149* (2013.01);
(Continued)

(58) Field of Classification Search
CPC ..... B25F 5/02; B25F 3/00; B25F 5/00; G08C 17/02; H02J 7/0042; G08B 25/00
See application file for complete search history.

(56) References Cited

U.S. PATENT DOCUMENTS

| | | | |
|---|---|---|---|
| 6,536,536 B1 | 3/2003 | Gass et al. | |
| 6,872,121 B2 * | 3/2005 | Wiesner | B25F 5/00 340/5.6 |

(Continued)

FOREIGN PATENT DOCUMENTS

| | | |
|---|---|---|
| DE | 42 04 420 A1 | 8/1993 |
| DE | 93 11 901 U1 | 12/1993 |

(Continued)

OTHER PUBLICATIONS

International Search Report corresponding to PCT Application No. PCT/EP2017/051874, dated Apr. 5, 22017 (German and English language document) (7 pages).

*Primary Examiner* — Hongmin Fan
(74) *Attorney, Agent, or Firm* — Maginot, Moore & Beck LLP

(57) ABSTRACT

An anti-theft module for a battery-operated electric machine tool includes at least a first data interface configured to transmit data to an external device. The anti-theft module also includes a position determination unit configured to determine a geographical position of the anti-theft module. The anti-theft module is configured to be installable as an adapter between a rechargeable battery interface of the electric machine tool and a replaceable battery.

16 Claims, 4 Drawing Sheets

(51) Int. Cl.
*B25F 5/02* (2006.01)
*H04W 4/021* (2018.01)
*H01H 47/00* (2006.01)

(52) U.S. Cl.
CPC ........ *G08B 13/1427* (2013.01); *H04W 4/021* (2013.01); *G08B 13/1463* (2013.01); *H01H 47/002* (2013.01)

(56) References Cited

U.S. PATENT DOCUMENTS

| | | | | |
|---|---|---|---|---|
| 2008/0135272 | A1* | 6/2008 | Wallgren | B25F 5/00 173/217 |
| 2009/0219118 | A1* | 9/2009 | Anderson | B25F 5/00 335/2 |
| 2013/0193891 | A1* | 8/2013 | Wood | B25F 5/00 318/434 |
| 2014/0151079 | A1* | 6/2014 | Furui | B25F 5/02 173/46 |
| 2014/0159920 | A1 | 6/2014 | Furui et al. | |
| 2014/0240125 | A1* | 8/2014 | Burch | G08B 21/0213 340/539.13 |
| 2015/0333666 | A1* | 11/2015 | Miller | H02P 4/00 318/139 |

FOREIGN PATENT DOCUMENTS

| | | |
|---|---|---|
| DE | 102 60 706 A1 | 7/2004 |
| DE | 10 2007 035 095 A1 | 1/2009 |
| DE | 10 2008 000 973 A1 | 10/2009 |
| DE | 10 2010 029 729 A1 | 12/2011 |
| DE | 10 2010 041 309 A1 | 3/2012 |
| DE | 10 2012 112 835 A1 | 6/2014 |
| WO | 2007/058596 A1 | 5/2007 |
| WO | 2009/013045 A1 | 1/2009 |

* cited by examiner

ANTI-THEFT MODULE FOR A RECHARGEABLE BATTERY-OPERATED ELECTRIC MACHINE TOOL, AND RECHARGEABLE BATTERY-OPERATED ELECTRIC MACHINE TOOL COMPRISING AN ANTI-THEFT MODULE

This application is a 35 U.S.C. § 371 National Stage Application of PCT/EP2017/051874, filed on Jan. 30, 2017, which claims the benefit of priority to Serial No. DE 10 2016 201 497.8, filed on Feb. 1, 2016 in Germany, the disclosures of which are incorporated herein by reference in their entirety.

The present disclosure relates to an anti-theft module for a battery-operated electric machine tool, and a battery-operated electric machine tool comprising an anti-theft module, according to the definition of the species in the disclosure.

BACKGROUND

Anti-theft systems for electric tools and gardening tools are becoming more and more important. This is particularly true for battery-operated electric tools in the professional sector, which in some cases are of high value. Consequently, such devices are often stolen from construction sites or from site trailers, as a result of which the respective construction firm may incur not only the cost of replacement, but also a significant administrative burden, for example, in order to resolve insurance matters. However, the demand for corresponding anti-theft systems is also growing in the private sector.

DE 10 2010 041 309 A1 discloses an anti-theft apparatus for a mobile device, in particular for a mobile tool, comprising a deactivation unit which is provided to make the device inoperable. The anti-theft device comprises a position determination unit for determining current geographical coordinates and is intended to process this coordination. Furthermore, the anti-theft device comprises an input unit for inputting an allowable working area, within which the mobile device may be operated without restrictions.

DE 10 2012 112 835 A1 discloses a system comprising a central license management unit and at least one tool device which comprises at least one communication device and one computing unit, wherein the computing unit is provided to make at least one function of the tool device usable, as a function of a piece of information received from the license management unit by means of the communication device. Furthermore, from DE 10 2012 112 835 A1, it is known to provide a position determination means in the tool device for ascertaining a location. In this case, the communication device may exchange data directly with a central computer, or with the central computer via a mobile data device, for example, a smartphone.

From the prior art, furthermore, anti-theft systems are known which protect an electric machine tool from unauthorized use or theft, in that a code may be sent to the electric machine tool by means of a remote control in order to enable it. Disabling the electric machine tool takes place by simply pressing a button on the remote control. A disadvantage of this approach is the necessity of always having the remote control on hand in order to enable it.

Other approaches provide for registering the serial number of an electric hand-held power tool along with a customer number, and in the event of a theft, informing the owner if the electric hand-held power tool turns up again. In addition, the electric hand-held power tool is blocked if an attempt is made at unauthorized operation. By means of a company-specific card, the device may be activated and subsequently enabled via an enabling key which is matched with it.

Furthermore, systems for tracking the position of an electric hand-held power tool, so-called tracking systems, are known, which exchange data about the electric hand-held power tool with a central server or a cloud, in order thus to enable an inventory or timely maintenance.

The object of the present disclosure is to provide a universal anti-theft module for an existing battery-operated electric machine tool, which, on the one hand, can be easily retrofitted, and on the other hand, is to ensure more reliable protection of the battery-operated electric machine tool, compared to the prior art.

SUMMARY

The present disclosure relates to an anti-theft module for a battery-operated electric machine tool, comprising a position determination unit for determining a geographical position of the anti-theft module, and comprising at least a first data interface for transmitting data, in particular position data, to an external device. According to the present disclosure, it is provided that the anti-theft module is installable as an adapter between a rechargeable battery interface of the electric machine tool and a replaceable battery. In a particularly advantageous manner, the anti-theft module may thus be easily installed as a retrofitted part, without an additional tool. New electric machine tools without anti-theft devices may thus also be correspondingly upgraded. An advantage of the present disclosure is furthermore that if a device or replaceable battery is misplaced or missing, its exact position may be determined at any time. The present disclosure is characterized in particular by its simplicity, modularity, and reusability. Furthermore, the user gains the advantage of being able to use the same anti-theft module in alternation on various electric machine tools and/or replaceable batteries.

A "battery-operated electric machine tool" is to be understood to mean, on the one hand, any device for processing workpieces by means of an electrically driven application tool. Thus, the electric machine tool may be designed as an electric hand-held tool or as a stationary electric machine tool. In this context, typical machine tools include hand-held or floor drills, screwdrivers, percussion drills, hammer drills, jigsaws, circular saws, miter saws, planers, angle grinders, orbital sanders, polishing machines, or the like. However, battery-operated gardening tools such as lawn mowers, lawn trimmers, pruning saws, or the like, may also be subsumed under the term "battery-operated electric machine tool." Furthermore, battery-operated electric machine tools are also to be understood to mean devices which are typically used at work sites.

Examples thereof include construction site radiators, heating devices, fans, pumps, measuring devices, construction site radios, etc. "Data interface" is in particular to be understood to mean an interface to wireless or wired, unidirectional or bidirectional, transmission of data between the anti-theft module and the external device. In this case, USB, Ethernet, or other bus systems may be used for wired transmission. Likewise, proprietary bus systems are conceivable. Wireless transmission typically takes place using transmission standards such as WLAN, BT, BTLE, ZigBee, NFC, RFID, GSM, UMTS, LTE, or the like. Of course, a proprietary transmission protocol is also conceivable here. The data interface may also be used inter alia for programming, for downloading updates, and for reading out or optionally resetting the anti-theft module via an external device. The "position determination unit" typically comprises a GPS receiver, but may also comprise other position determination services such as Galileo or Glonass. In addition, position determination within buildings may be based on WLAN, beacons, or existing infrastructure elements, such as smoke detectors equipped with BT or WLAN or the like. Of course, a combination of outdoor and indoor position determination services is also possible. An "external device" describes a device which is not mechanically connected to the battery-operated electric machine tool. The external device communicates with the first data interface via the aforementioned services, and for this purpose, it comprises a corresponding data interface for wired or wireless transmission of the data provided by the anti-theft module. In addition, the external device comprises a processor and a random-access memory in a known manner. Possible external devices include, for example, a smartphone, a smartwatch, intelligent eyeglasses, a remote control which is specifically designed for the electric machine tool, as well as a PC, a server, or a data cloud. However, the external device may also be another anti-theft module, so that a plurality of anti-theft modules may communicate directly with one another. A "replaceable battery" is primarily to be understood to mean a rechargeable energy storage which is equipped with at least one Li-ion, NiCd, or NiMH cell, or the like; however, fuel cells and non-rechargeable battery cells may also form the replaceable battery.

For processing and forwarding the position data ascertained by the position determination unit, the anti-theft module comprises a computing unit which is connected to the at least a first data interface. Thus, the data may be processed by the anti-theft module autonomously in a particularly advantageous manner, without a data connection to an external device being necessary. A "computing unit" is to be understood to mean any form of processors, for example, microcontrollers, DSPs, ASICs, or the like, for processing routines, programs, and/or scripts, independently of the code sequences and protocols used, including required memory modules. However, correspondingly discrete and hybrid designs of computing units are possible. Since a plurality of anti-theft modules may thus communicate among one another, it is possible to span an additional network, in order to establish communication with a server or a cloud if a mobile radio network is not available, via one or a plurality of the other anti-theft modules.

In addition, another data interface is provided for detecting operating data generated by the electric machine tool and/or the replaceable battery, and/or for influencing an operating state of the electric machine tool and/or the replaceable battery. Due to the possibility of performing position location and initiating actions, theft of the electric machine tool and/or the replaceable battery may be prevented in an advantageous manner, and the case of theft, reconnaissance and tracking may be facilitated. In addition, the anti-theft module may be used for a firmware or software update of the electric machine tool and/or the replaceable battery. If the basic functionality of a data logger is included in the anti-theft module, specific and application-related data for devices may be detected, stored internally or externally, and processed. It should be noted that the additional data interface may use the same wired or wireless transmission standards and methods as the aforementioned first data interface. Due to the direct connection between the anti-theft module and the electric machine tool or the replaceable battery, wired data transmission is in particular suitable here. In this context, it should be mentioned that the term "wired" also comprises such connections which run directly from a printed circuit board via plug contacts, or from the electric machine tool and/or the replaceable battery via leadframes, to the anti-theft module.

In addition, a sensor unit is provided for detecting a disconnection of the anti-theft module from the rechargeable battery interface of the electric machine tool and/or the replaceable battery. For this purpose, the anti-theft module may, for example, send a data sequence to the electric machine tool and/or the replaceable battery via the rechargeable battery interface at regular time intervals, which is acknowledged by the electric machine tool and/or the replaceable battery. In the absence of the acknowledgment signal, an unauthorized disconnection is assumed. In the case of wireless data transmission between the anti-theft module and the electric machine tool and/or the replaceable battery, if there is an interruption of the radio connection or a significant reduction of the transmission and reception power below a specified attenuation (RSSI), a disallowed distance between the electric machine tool and the anti-theft module, and thus a mechanical separation, may be assumed. Actions in the case of a detected separation may, for example, include the anti-theft module setting off an alarm via the first data interface, so that a security firm is notified, a reconnaissance drone being started, or the like. In addition, the anti-theft module may report the incident to the electric machine tool and/or to the replaceable battery via the additional data interface, in order to block it from further use and thus to make it unusable.

In another embodiment of the present disclosure, a sensor is provided for detecting a change in state of the anti-theft module, the electric machine tool, and/or the replaceable battery, said sensor initiating data transmission to the external device, to the electric machine tool, and/or to the replaceable battery, if a sensor signal generated by the sensor exceeds or falls below a defined threshold value. In this case, for example, a movement sensor may be used as a sensor for detecting movement of the anti-theft module. If the anti-theft module is moved, it may thus detect the movement and bring about corresponding actions, for example, sending position information to a cloud after a quiescent phase, re-activating the computing unit, or the like. Thus, the power consumption of the anti-theft module may be advantageously minimized. In addition, current, voltage, temperature, and other environmental sensors are conceivable for detecting air pressure, humidity, or the like, as a function of which, certain operating modes of the electric machine tool and/or the replaceable battery are enabled or disabled.

Furthermore, it is provided that the anti-theft module comprises an energy interface which is connected to the replaceable battery, an energy storage device, and/or a power generation unit for supplying the anti-theft module with power. In particular, the energy storage device and the power generation unit provide the advantage that the anti-theft module is also supplied with power even in the state of not being connected to the replaceable battery, or in the case of a discharged replaceable battery, so that said module is able to carry out the function for which it is intended at all times. Any type of rechargeable battery, battery, etc. is possible as an energy storage device. For example, a solar cell, a device for recuperating kinetic energy, or the like, may be used as a power generation unit. In the case of rechargeable batteries which are integrated into the anti-theft module, they may be charged via the replaceable battery and the energy interface, if a power supply is available. For this purpose, the voltage of the replaceable battery is optionally adjusted as needed via an energy conversion unit and/or a charging unit, for charging the integrated rechargeable battery. Corresponding charging and energy conversion units are known to those skilled in the art; therefore, they will not be discussed further here.

Advantageously, the anti-theft module comprises a display element for displaying, and/or an operating element for changing a status or mode of the anti-theft module, the electric machine tool, and/or the replaceable battery. Thus, in connection with the position determination unit, for example, a predetermined area may be defined which generates an alarm by means of geofencing when it is exited, and initiates one of the described actions. The display element and/or the operating element may be parts of a user-machine interface (HMI), in particular a touchscreen. However, LEDs may also display the various operating states of the anti-theft module, for example, alarm active, system ready, network available, battery full, link to the electric machine tool and/or the replaceable battery existing or interrupted, or the like. In order to be able to make adjustments to the anti-theft module, alternatively or in addition to the HMI, switch elements such as switches, capacitive or inductive sensors, etc. are conceivable.

In order to avoid an unauthorized disconnection of the anti-theft module from the rechargeable battery interface of the electric machine tool and/or the replaceable battery, a locking or latching element is provided on the anti-theft module, which engages with a corresponding mating latching element of the rechargeable battery interface or the replaceable battery, when the anti-theft module is connected to the rechargeable battery interface or the replaceable battery. In order to disconnect the anti-theft module from the rechargeable battery interface and/or from the replaceable battery, the locking or latching element must be released, so that the positive lock between the latching element and the mating latching element is disengaged. The release may advantageously take place via the external device.

Advantageously, the anti-theft module also comprises a mechanical safety device, in particular a mechanical lock or a combination lock, and/or an electromechanical safety device, in particular a relay or the like, for protection from unauthorized removal of the anti-theft module from the rechargeable battery interface of the electric machine tool and/or from the replaceable battery.

In an additional, advantageous embodiment, it is provided that the anti-theft module comprises an accommodation device for at least two replaceable batteries having the same or a different nominal voltage. In this case, the anti-theft module comprises corresponding voltage transformers for adjusting the different replaceable battery nominal voltages to the requirements of the electric machine tool.

Additional advantages of the present disclosure result via the features specified herein, and from the drawing and the subsequent description.

BRIEF DESCRIPTION OF THE DRAWINGS

The present disclosure will be described by way of example based on FIGS. 1 to 6, wherein identical reference characters in the figures indicate identical components having an identical function. Those skilled in the art will correspondingly combine individual components of the exemplary embodiments as needed.

The following are shown.

DETAILED DESCRIPTION

Figure 1:
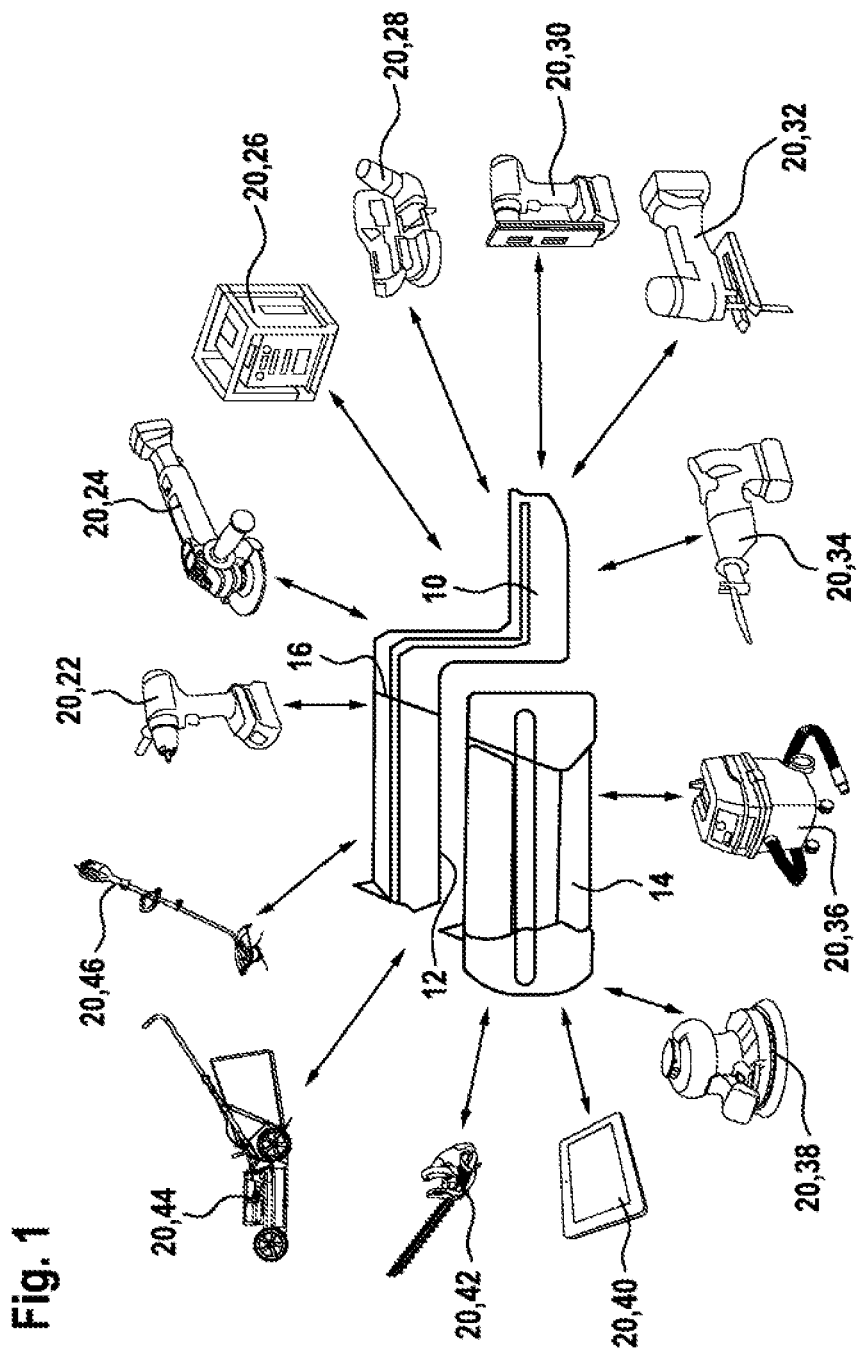
FIG. 1: the use of an anti-theft module according to the present disclosure, for various types of battery-operated electric machine tools.

FIG. 1 depicts a first exemplary embodiment of the anti-theft module 10 according to the present disclosure. Said module may, on the one hand, be connected to a replaceable battery 14 via an accommodation device 12, and on the other hand, to a rechargeable battery interface 18 (compare, for example, with FIG. 3) of a battery-operated electric machine tool 20 via an interface 16. As already initially mentioned, the battery-operated electric machine tool 20 may, for example, be designed as an impact wrench, an impact drill or a hammer drill 22, an angle grinder 24, a construction site radio 26, a polishing machine 28, a drywall screw gun 30, a jigsaw 32, a reciprocating saw 34, a vacuum cleaner 36, a milling machine 38, a remote control 40, a hedge trimmer 42, a lawn mower 44, or a trimmer 46. Basically, all types of battery-operated electric machine tools are conceivable for using the anti-theft module 10 according to the present disclosure. FIG. 1 is therefore not to be understood as being restrictive, but merely as a possible exemplary embodiment. The anti-theft module 10 may therefore preferably be installed on existing electric machine tools 20 and/or replaceable batteries 14, so that retrofitting is possible by a user without great effort. Likewise, it is also possible for the manufacturer to equip electric machine tools 20 which are new on the market and which have already been produced, with the anti-theft module 10.

Figure 2:
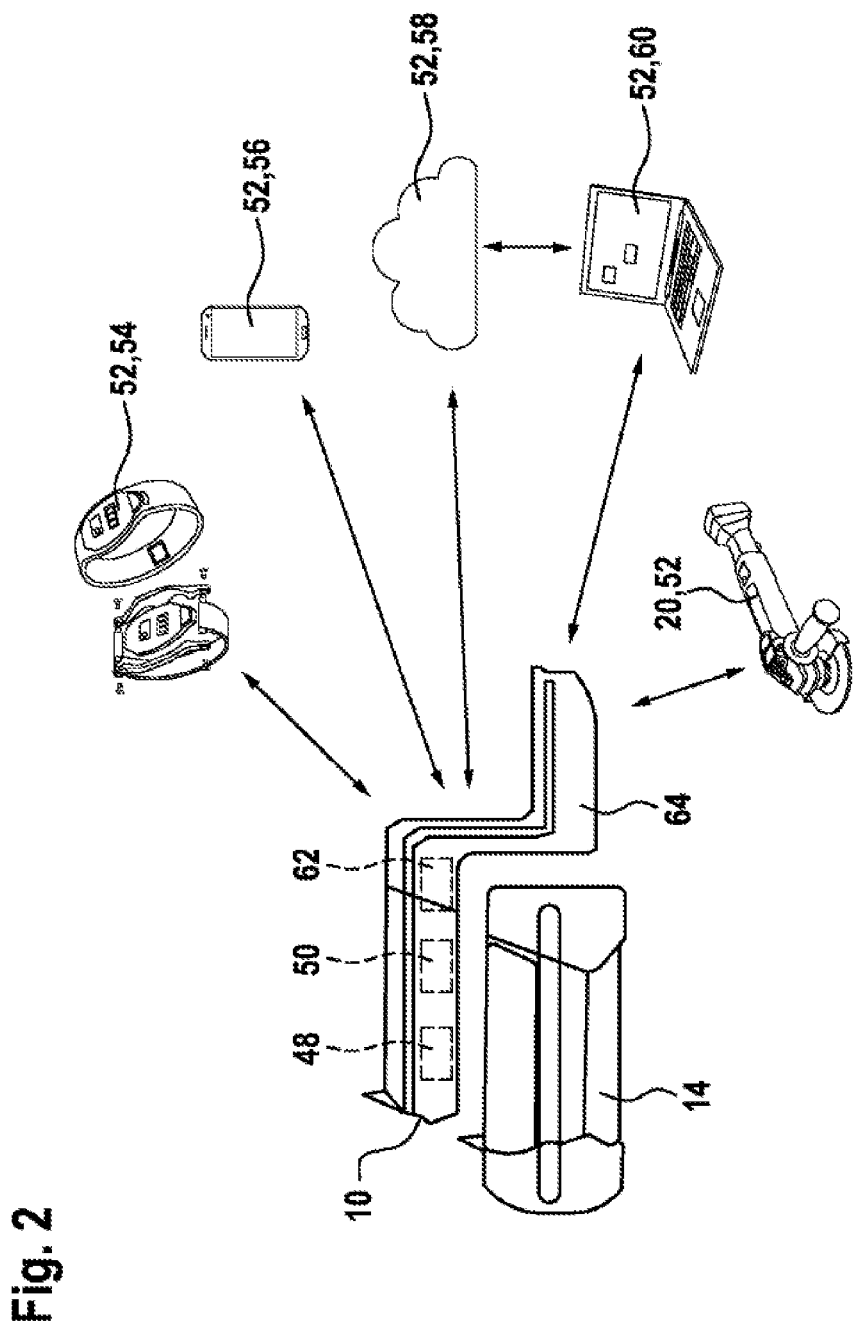
FIG. 2: the use of an anti-theft module according to the present disclosure, for transmitting data to various types of external devices, in a first exemplary embodiment.

According to a first exemplary embodiment of the anti-theft module 10 according to the present disclosure, in FIG. 2, said module comprises a position determination unit 48 for determining a geographical position of the anti-theft module 10, and at least a first data interface 50 for transmitting data to an external device 4. In the depicted example, the data interface 50 functions wirelessly. The transmission typically takes place using transmission standards such as WLAN, BT, BTLE, ZigBee, NFC, RFID, GSM, UMTS, LTE, or the like. Of course, proprietary transmission protocols are also conceivable. The position determination unit 48 typically comprises a GPS receiver, but may also comprise other position determination services, such as Galileo or Glonass. Within buildings, the position determination may also be based on WLAN, beacons, or existing infrastructure elements, such as smoke detectors equipped with BT or WLAN, or the like. Of course, a combination of outdoor and indoor position determination services is also possible.

FIG. 2 shows a smartwatch 54, a smartphone 54, a data cloud 58, and a PC 60 as examples of an external device 52. Other devices which are not mechanically connected to the electric machine tool 20, for example, intelligent eyeglasses, a remote control 40 which is specially designed for the electric machine tool 20, a server, or the like, are also possible as an external device 52. However, the external device 52 may also be another anti-theft module 10, an additional electric machine tool 20, or an additional replaceable battery 14, so that a plurality of anti-theft modules 10 communicate directly with one another and may form a network for integrating other anti-theft modules 10, electric machine tools 20, and/or external devices 52. The external devices 52 communicate with the data interface 50 via the aforementioned services, and they also have a corresponding data interface for wired or wireless transmission of the data provided by the anti-theft module 10. Furthermore, the external devices comprise a processor and a random-access memory in a known manner. However, since the external devices 52 are sufficiently known to those skilled in the art, they will not be discussed here in greater detail.

In connection with the external device 52, for example, via an app or a program, an allowed area may thus be defined, within which the electric machine tool 20 may be operated without restrictions. The allowed area is communicated to the anti-theft module 10 via the first data interface 50 and processed by a computing unit 62 in the form of geofencing, so that said computing unit is able to detect whether the allowed area is exited, by means of the position determination unit 48. In this case, the anti-theft module 10 communicates the exiting of the allowed area to the external device 52 as an alarm, via the first data interface 50. Alternatively, however, it is also possible that the detection takes place via the exiting of the allowed area by the external device 52. In this case, the anti-theft module 10 regularly transmits only its position data to the external device 52, without evaluating said data. Re-entry into the allowed area may be processed in a corresponding manner.

Furthermore, the first data interface 50 may be used for programming, for downloading updates, and for reading out or optionally resetting the anti-theft module 10 via the external device 52.

Furthermore, the anti-theft module 10 according to FIG. 2 comprises at least one additional data interface 64, via which it may exchange unidirectional or bidirectional data with the electric machine tool 20 and/or the replaceable battery 14. The type of data transmission may take place in a wired or wireless manner, and may use the transmission standards already described for the first data interface 50. Thus, for example, operating data, error codes, etc. may be transmitted from the electric machine tool 20 and/or the replaceable battery 14, to the anti-theft module 10, where the computing unit 62 may process, evaluate, and optionally transmit them to the external device 52 via the first data interfaces 50. In addition, the anti-theft module 10 may receive updates for the electric machine tool 20 and/or the replaceable battery 14, and forward said updates to them. If the basic functionality of a data logger is included in the anti-theft module 10, device-related and application-related data may thereby be detected and stored internally or externally, and optionally processed.

In addition, the at least one additional data interface 64 allows access to the actuator system of the electric machine tool 20 and/or to the controller of the replaceable battery 14, if they are correspondingly equipped. Thus, in connection with the above-described geofencing, for example, the maximum power, the maximum rotational speed, and/or the maximum torque of a drive of the electric machine tool 20, and/or the maximum number of charging and discharging cycles of the replaceable battery 14, may be reduced to absolute shutdown, depending on the distance from the allowed area. It is also conceivable to restrict the various operating mode of the electric machine tool 20 successively.

Figure 3:
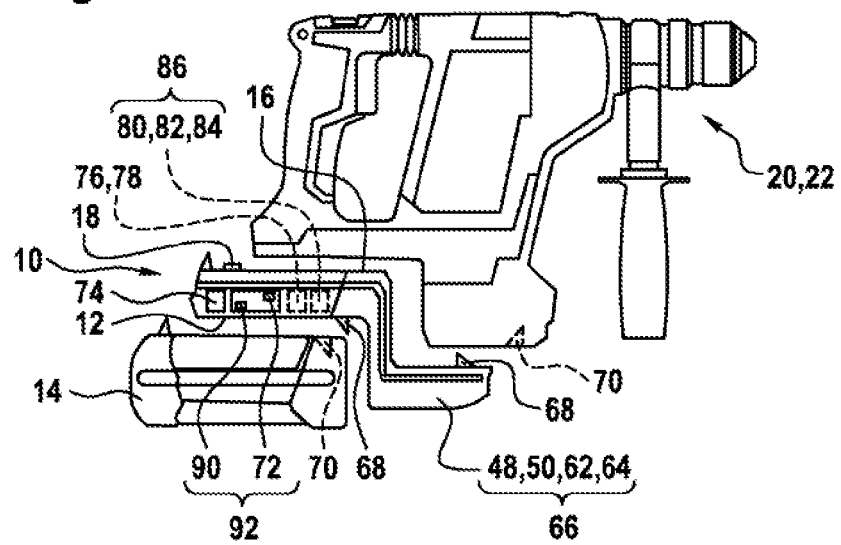
FIG. 3: the anti-theft module according to the present disclosure, in a second embodiment, in the installed state, between a replaceable battery and a rechargeable battery interfaces of a battery-powered hammer drill.
Figure 4:
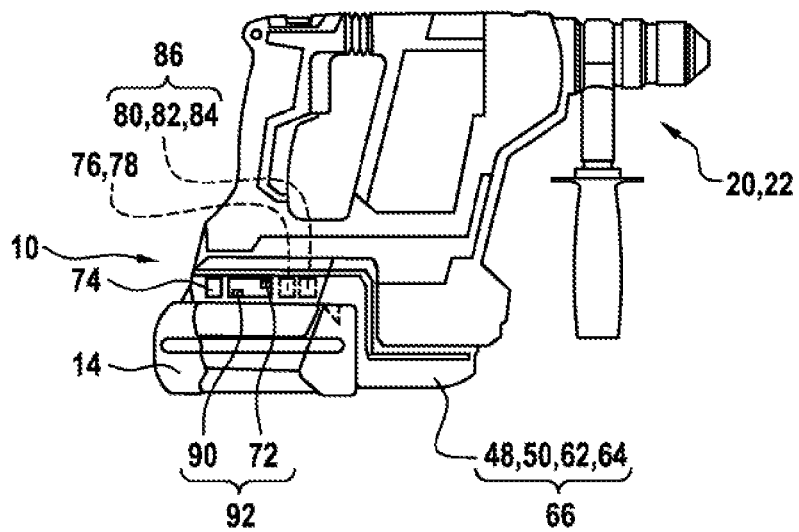
FIG. 4: the anti-theft module according to the present disclosure, in the second embodiment, in the uninstalled state, between the replaceable battery and the rechargeable battery interfaces of the battery-powered hammer drill.

FIG. 3 shows a second exemplary embodiment of an anti-theft module 10 according to the present disclosure, for an electric machine tool 20 designed as a battery-powered hammer drill 22, in an uninstalled state, wherein, for the sake of clarity, the position determination unit 48, the first data interface 50, the computing unit 62, and the at least one additional data interface 64 have been combined into a common block 66. FIG. 4 depicts the installed state of the anti-theft module 10 on the electric machine tool 20 and the replaceable battery 14.

In order to avoid an unauthorized disconnection of the anti-theft module 10 from the rechargeable battery interface 18 of the electric machine tool 20 and/or the replaceable battery 14, at least one locking or latching element 68 is provided on the anti-theft module 10, which engages with a corresponding mating latching element 70 of the rechargeable battery interface 18 or the replaceable battery 14, when the anti-theft module 10 is connected to the rechargeable battery interface 18 or the replaceable battery 14. In order to disconnect the anti-theft module 10 from the rechargeable battery interface 18 and/or the replaceable battery 14, the locking or latching element must be released, so that the positive locking between the latching element 68 and the mating latching element 70 is disengaged. The release may advantageously take place via the external device 52. Alternatively or in addition, however, the release could also take place via a code or PIN input of an operating unit 72 or a fingerprint sensor 74 of the anti-theft module 10.

In the case of detection of an unauthorized disconnection of the anti-theft module 10 from the electric machine tool 20 and/or the replaceable battery 14, an actions is taken by the anti-theft module 10, for example, setting off an alarm to an external device 52, alerting a previously stored security firm, or even starting a reconnaissance drone. Likewise, in the case of a detected disconnection, it may be provided to restrict or completely disable the functionality of the electric machine tool 12 and/or the replaceable battery 14.

The disconnection of the anti-theft module 10 from the electric machine tool 20 and/or the replaceable battery 14 may, for example, be detected by means of a sensor unit 76, in that the anti-theft module 10 sends a message to the electric machine tool 20 and/or the replaceable battery 14 at regular intervals via the other data interface 64, which must be acknowledged by the electric machine tool 20 or the replaceable battery 14. In the case of disconnection of the anti-theft module 10 from the electric machine tool 20 and/or the replaceable battery 14, this acknowledgment signal remains off, and the anti-theft module 10 takes the aforementioned measures. Furthermore, in the case of an existing radio connection between the anti-theft module 10 and the electric machine tool 20 or the replaceable battery 14 via the at least one additional data interface 64, the distance between the anti-theft module 10 and the electric machine tool 20 or the replaceable battery 14 may be inferred, based on the measurable attenuation (RSSI). If the RSSI value falls below a previously defined threshold value, an unauthorized disconnection may be inferred.

Furthermore, FIG. 3 shows a sensor 78 for detecting a change in state of the anti-theft module 10, the electric machine tool 20, and/or the replaceable battery 14, which initiates data transmission to the external device 52, to the electric machine tool 20 and/or to the replaceable battery 14, if a sensor signal generated by the sensor 78 exceeds or falls below a defined threshold value. In the depicted example, the sensor 78 is a component of the sensor unit 76, but may also be designed to be separate from it. The sensor 78 may, for example, be a movement sensor for detecting movement of the anti-theft module 10. If the anti-theft module 10 is moved, it may thus detect the movement and may bring about corresponding actions, for example, sending position information to the cloud 60 after a quiescent phase, re-activating the computing unit 64, or the like. In addition, current, voltage, temperature, and other environmental sensors for detecting air pressure, humidity, or the like, are conceivable, as a function of which, certain operating modes of the electric machine tool 20 and/or the replaceable battery 14 are enabled or disabled.

The anti-theft module 10 comprises an energy interface 80 which is connected to the replaceable battery 14, an energy storage device 82, and/or a power generation unit 84 for supplying the anti-theft module 10 with power. For the sake of clarity, the energy interface 80, the energy storage device 82, and the power generation unit 84 have been combined into a block 86 in FIGS. 3 and 4, but may also be designed to be separate from one another. In particular, the energy storage device 82 and the power generation unit 84 allow supplying the anti-theft module 10 with power even in the state of not being connected to the replaceable battery 14, or in the case of a discharged replaceable battery 14, so that said module is able to carry out the functions for which it is intended at all times. Any type of rechargeable battery, battery, etc. is possible as an energy storage device 82. The power generation unit 84 may be designed as a solar cell, a device for recuperating kinetic energy, or the like. If an available energy supply is available, rechargeable batteries may be charged via the energy interface 80. For this purpose, if necessary, for example, the voltage may be adjusted via an energy conversion unit which is not depicted and/or a charging unit which is not depicted, for charging the integrated rechargeable battery. Corresponding charging and energy conversion units are known to those skilled in the art; therefore, they will not be discussed further here.

In addition to the operating element 72, which is also used for changing a status or mode of the anti-theft module 10, the electric machine tool 20, and/or the replaceable battery 14, the anti-theft module 10 also comprises a display element 90 for displaying the status or mode which has been set. Thus, for example, in connection with the position determination unit 48, a predefined area may be defined independently of an external device 52, which generates an alarm by means of geofencing if it is exited, and initiates one of the previously described actions. In the depicted exemplary embodiment, the display element 90 and the operating element 72 are parts of a user-machine interface (HMI) 92, in particular a touchscreen, but may also be designed to be separate. Alternatively or in addition, LEDs are also conceivable, which display various operating states of the anti-theft module 10, for example, alarm active, system ready, network available, rechargeable battery full, link with the electric machine tool 20 and/or the replaceable battery 14 existing or interrupted, or the like. In order to be able to make adjustments to the anti-theft module 10, alternatively or in addition to the HMI 92, switch elements such as switches, capacitive or inductive sensors, etc. are conceivable, which, however, will not be described in detail here, since their functionality is known to those skilled in the art.

In the following FIGS. 5 and 6, the details of the anti-theft module 10 described in FIGS. 3 and 4 have been omitted for the sake of clarity. Nonetheless, they may be components of the depicted anti-theft module 10 in the third and fourth embodiments.

Figure 5:
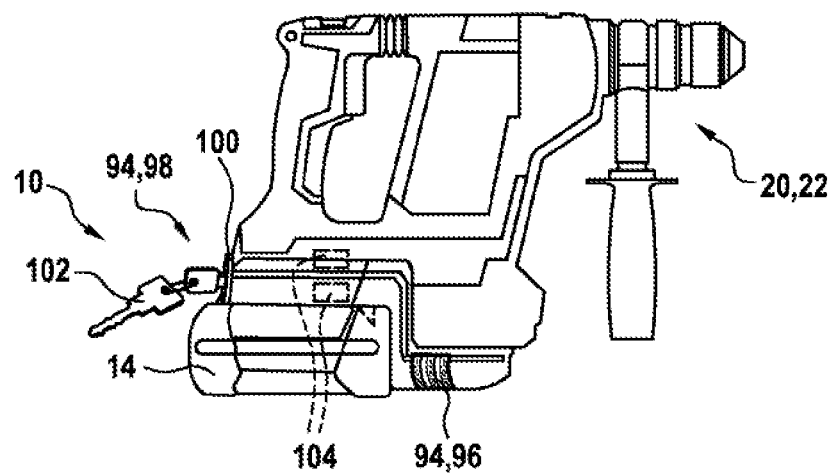
FIG. 5: the anti-theft module according to the present disclosure, in a third embodiment, comprising at least one mechanical safety device.

FIG. 5 shows the anti-theft module 10 comprising at least one mechanical safety device 94 in the form of a combination lock 96, and a mechanical lock 98 comprising a lock cylinder 100 and fitting keys 102, for protection from unauthorized removal of the anti-theft module 10 from the electric machine tool 20 or the replaceable battery 14. Alternatively or in addition, however, an electromechanical safety device 104, in particular a relay or the like, is also conceivable.

Figure 6:
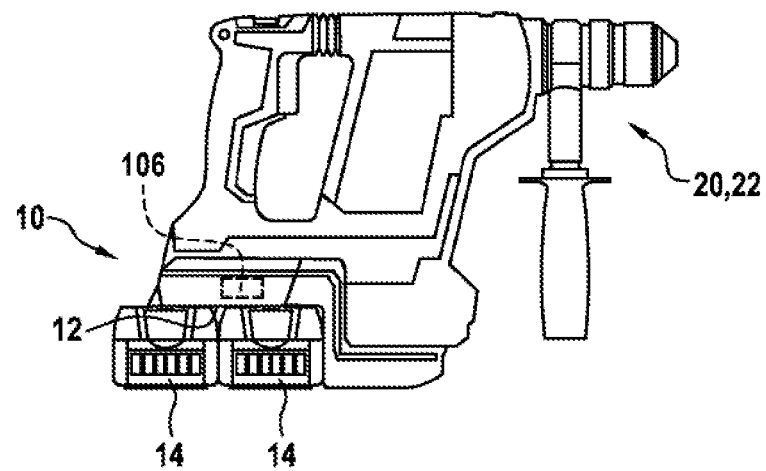
FIG. 6: the anti-theft module according to the present disclosure, in a fourth embodiment, comprising an accommodation device for at least two replaceable batteries.

In FIG. 6, the accommodation device 12 of the anti-theft module 10 is designed in such a way that it can accommodate at least two replaceable batteries 14 having the same or a different nominal voltage. For different nominal voltages of the replaceable batteries 14, the anti-theft module 10 comprises a corresponding voltage transformer 104 for adjusting the various replaceable battery nominal voltages to the requirements of the electric machine tool 20.

Finally, it should also be pointed out that the depicted exemplary embodiments are restricted neither to FIGS. 1 to 6, nor to the form depicted there of the anti-theft module 10 or the electric machine tool 20 designed as a battery-operated hammer drill 22. In addition, it should be explicitly mentioned that the depicted exemplary embodiments are freely combinable with the anti-theft module 10, depending on the requirements. This holds true, for example, for the use of the anti-theft module 10 with one or a plurality of replaceable batteries 14, or with and without the depicted safety devices.

The invention claimed is:

1. An anti-theft module for a battery-operated electric machine tool, comprising:
   a first data interface configured to transmit data to an external device; and
   a position determination unit configured to determine a geographical position of the anti-theft module,
   wherein the anti-theft module is configured to be installable as an adapter between a rechargeable battery interface of the electric machine tool and a replaceable battery, and
   further comprising:
   a sensor configured to detect a change in state of the anti-theft module and further configured to initiate data transmission to the external device when the change in state of the anti-theft module is detected; and
   a sensor unit configured to detect a disconnection of the anti-theft module from the rechargeable battery interface of the electric machine tool and/or the replaceable battery.

2. The anti-theft module as claimed in claim 1, further comprising:
   a computing unit operably connected to the first data interface and configured to process and forward geographical position data ascertained by the position determination unit.

3. The anti-theft module as claimed in claim 1, further comprising:
   an additional data interface configured to detect operating data generated by the electric machine tool and/or influence an operating state of the electric machine tool and/or the replaceable battery.

4. The anti-theft module as claimed in claim 1, wherein the sensor is a movement sensor configured to detect movement of the anti-theft module.

5. The anti-theft module as claimed in claim 1, further comprising:

an energy interface operably connected to at least one of the replaceable battery, an energy storage device, and a power generation unit and configured to supply the anti-theft module with power.

6. The anti-theft module as claimed in claim 1, further comprising:
a display element configured to display and/or an operating element configured to change a status or mode of the anti-theft module, the electric machine tool, and/or the replaceable battery.

7. The anti-theft module as claimed in claim 6, wherein at least one of the display element and the operating element are parts of a user-machine interface.

8. The anti-theft module as claimed in claim 7, wherein the user-machine interface is a touchscreen.

9. The anti-theft module as claimed in claim 1, further comprising:
at least one locking or latching element configured to engage with a corresponding mating latching element of the rechargeable battery interface or the replaceable battery, when the anti-theft module is operably connected to the rechargeable battery interface of the electric machine tool or the replaceable battery.

10. The anti-theft module as claimed in claim 9, wherein the at least one locking or latching element is released using the external device.

11. The anti-theft module as claimed in claim 1, wherein the data is position data.

12. An anti-theft module for a battery-operated electric machine tool, comprising:
a first data interface configured to transmit data to an external device; and
a position determination unit configured to determine a geographical position of the anti-theft module,
wherein the anti-theft module is configured to be installable as an adapter between a rechargeable battery interface of the electric machine tool and a replaceable battery, and further comprising:
a mechanical safety device configured to protect from unauthorized removal of the anti-theft module from at least one of (i) the rechargeable battery interface of the electric machine tool and (ii) the replaceable battery; and
a sensor unit configured to detect a disconnection of the anti-theft module from the rechargeable battery interface of the electric machine tool and/or the replaceable battery.

13. The anti-theft module as claimed in claim 12, wherein the mechanical safety device is at least one of a mechanical lock, a combination lock, and an electromechanical safety device.

14. The anti-theft module as claimed in claim 13, wherein the electromechanical safety device is a relay.

15. An anti-theft module for a battery-operated electric machine tool, comprising:
a first data interface configured to transmit data to an external device; and
a position determination unit configured to determine a geographical position of the anti-theft module,
wherein the anti-theft module is configured to be installable as an adapter between a rechargeable battery interface of the electric machine tool and a replaceable battery, and further comprising:
an accommodation device for at least two replaceable batteries having the same or a different nominal voltage; and
a sensor unit configured to detect a disconnection of the anti-theft module from the rechargeable battery interface of the electric machine tool and/or the replaceable battery.

16. An anti-theft module for a battery-operated electric machine tool, comprising:
a first data interface configured to transmit data to an external device; and
a position determination unit configured to determine a geographical position of the anti-theft module,
wherein the anti-theft module is configured to be installable as an adapter between a rechargeable battery interface of the electric machine tool and a replaceable battery, and
further comprising:
a sensor configured to detect a change in state of (i) the anti-theft module, (ii) the electric machine tool, and/or (iii) the replaceable battery and further configured to initiate data transmission to (i) the external device, (ii) the electric machine tool and/or (iii) the replaceable battery, when a sensor signal generated by the sensor exceeds or falls below a defined threshold; and
a sensor unit configured to detect a disconnection of the anti-theft module from the rechargeable battery interface of the electric machine tool and/or the replaceable battery.

* * * * *